United States Patent [19]
Che et al.

[11] Patent Number: 5,636,303
[45] Date of Patent: Jun. 3, 1997

[54] FILTERLESS CHROMATICALLY VARIABLE LIGHT SOURCE

[75] Inventors: Diping Che, Sarasota; Harry Fein, Venice, both of Fla.

[73] Assignee: World Precision Instruments, Inc., Sarasota, Fla.

[21] Appl. No.: 574,359

[22] Filed: Dec. 18, 1995

[51] Int. Cl.$^6$ .................................................. G02B 6/32
[52] U.S. Cl. .................................................... 385/33
[58] Field of Search ............................ 385/31–33, 147; 359/419, 891, 246, 281; 356/241, 260, 345

[56] References Cited

U.S. PATENT DOCUMENTS

| | | |
|---|---|---|
| 4,401,694 | 8/1983 | Quick et al. ................. 427/162 |
| 4,643,519 | 2/1987 | Bussard et al. ............... 385/33 X |
| 5,074,641 | 12/1991 | Nakai et al. .................. 385/147 X |
| 5,077,814 | 12/1991 | Shigematsu et al. ......... 385/24 |
| 5,226,105 | 7/1993 | Myers ............................ 385/147 |
| 5,239,609 | 8/1993 | Auteri ............................ 385/147 X |
| 5,325,453 | 6/1994 | Drissler ......................... 385/33 X |
| 5,394,492 | 2/1995 | Hwang .......................... 385/33 |

*Primary Examiner*—Akm E. Ullah
*Attorney, Agent, or Firm*—Chilton, Alix & Van Kirk

[57] ABSTRACT

A chromatically variable light source includes a plurality of light emitting diodes which generate substantially monochromatic light at different wavelengths. The light source includes circuitry for selectively energizing one or more of the light emitting diodes and for controlling the intensity of the generated light. The light generated by the light emitting diodes is combined in a single light pipe and delivered to an output port for use.

24 Claims, 2 Drawing Sheets

FILTERLESS CHROMATICALLY VARIABLE LIGHT SOURCE

BACKGROUND OF THE INVENTION

1. Field of the Invention

The present invention relates to the generation of substantially monochromatic light and, particularly, to the production of light at a plurality of selected wavelengths for use in colorimetry, fluorometry, and other applications. More specifically, this invention is directed to a light source which selectively provides monochromatic light of different colors and, especially, to a multicolor light generator which does not employ opto-mechanical elements such as filters and lenses. Accordingly, the general objects of the present invention are to provide novel and improved methods and apparatus of such character.

2. Description of the Prior Art

Many industrial applications and fields of scientific research, such as colorimetry and fluorometry, require the use of essentially monochromatic light, i.e., light centered on a known wavelength and having a narrow band width. In the prior art, such monochromatic light was typically produced by filtering a white light source using opto-mechanical elements which pass light in the narrow band of interest. In order to change the color of the radiation, the opto-mechanical element, i.e., a filter, must be changed. Accordingly, in order to selectively provide light at different wavelengths from a given source, means must be provided to mechanically or manually replace a filter element.

The prior art briefly discussed above has a number of inherent disadvantages. Firstly, the light source is not efficiently used because only a small spectral portion of the emitted light is selected by the filter. Further, the requirement for physical movement of a filtering device limits stability and temporal performance. Additionally, the need to provide plural filters and the means for substituting filters in the path of the emitted light increases the complexity of the light source and thus increases its cost while reducing both its reliability and volumetric efficiency.

SUMMARY OF THE INVENTION

The present invention overcomes the above-briefly discussed and other deficiencies and disadvantages of the prior art through the generation of monochromatic light of different colors in a manner which enables the selected wavelength to be rapidly generated and displayed. The invention also encompasses a novel light source with the capability of rapidly and selectively generating light of different color. This novel light source "switches" between the available colors at high speed through the use of solid state electronic devices only.

Apparatus in accordance with a preferred embodiment of the invention utilizes a plurality of light emitting diodes (LEDs) with different, narrow, spectral band-widths. The optical intensities of these LEDs are individually controlled. A fiber optical coupler combines the light emitted by the LEDs and directs this light to a common output port. Variation of the spectral characteristic of the generated light is achieved by selectively switching the LEDs between conductive and nonconductive states. Further, by means of simultaneously gating a plural of the LEDs into the conductive states and individually controlling the intensity of the output of the LEDs and/or their duty cycle, additional colors may be synthesized.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the figures and in which.

DESCRIPTION OF THE DISCLOSED EMBODIMENT

Figure 1:
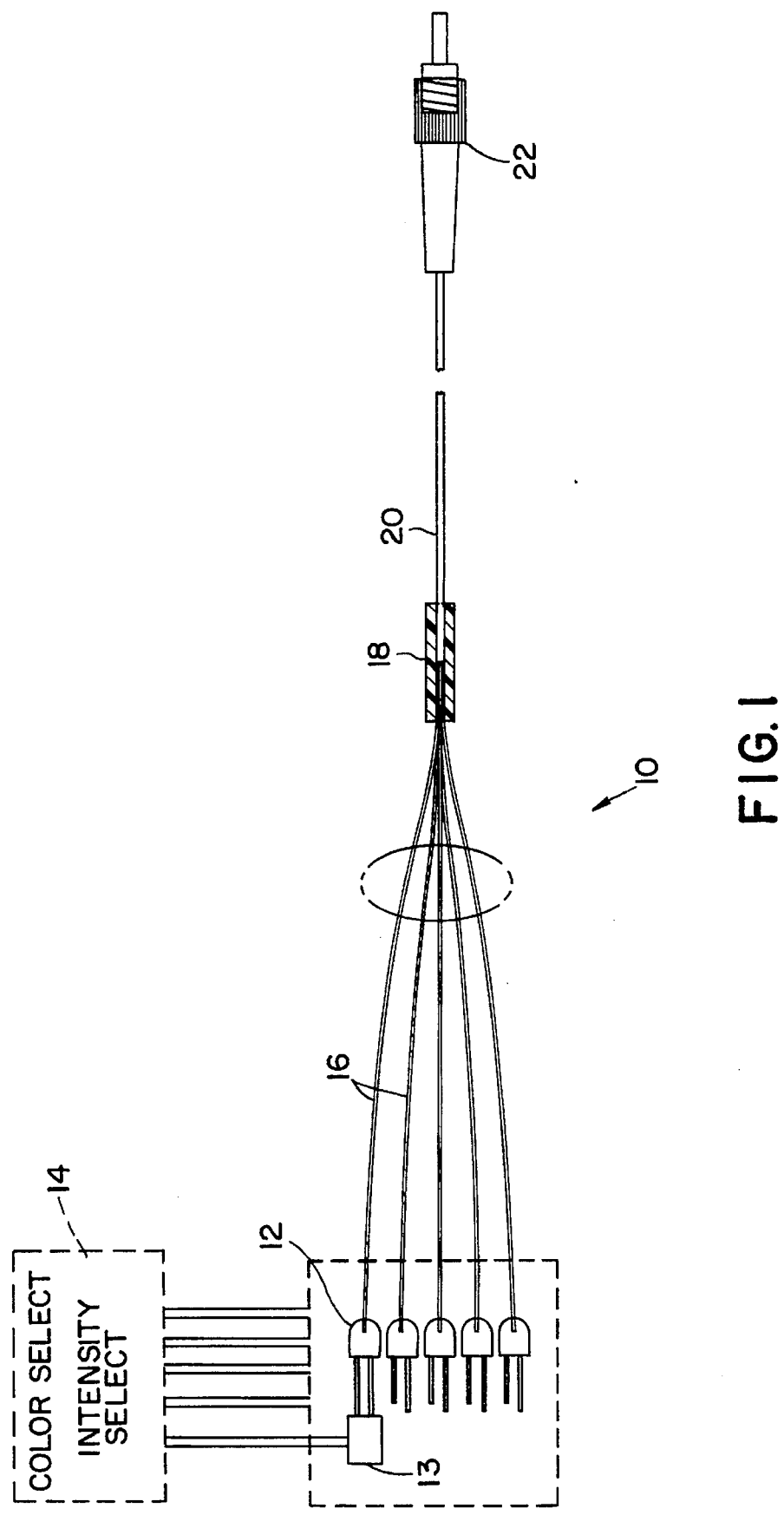
FIG. 1 is a schematic view of a multi-color narrow band light source in accordance with the present invention.

With reference to the drawings, a filterless chromatically variable light source in accordance with the present invention comprises a light generator, indicated generally at 10, which consists of an array of light emitting diodes (LEDs) 12. The LEDs 12 provide bright light in the visible spectrum with a typical spectral line half-width in the range of 13–35 nanometers over a wavelength range of 400–700 nm. The LEDs 12 will, when gated into the conductive state, provide light of different color. For example, blue light having a wavelength of 450 nm can be obtained through use of a Nichia Company LED type NLPB500. As yet another example, yellow light at 590 nm is generated by Toshiba Company LED type TLYH180P. The light produced by such LEDs is, as noted above, relatively monochromatic. By way of example, the above-identified yellow light emitting LED provides light with a 13 nm band width.

In the manner which will be described below in the discussion of FIG. 2, the individual LEDs 12 of the array comprising light generator 10 will be selectively turned on and off, and the output light intensity controlled, by associated individual control circuits 13 which operate under the command of a color intensity selection circuit 14. Selection circuit 14 provides command signals which allows the individual LEDs 12 to be gated to the conductive, i.e., light emitting, state individually or in groups. Signals provided by selection circuit 14 also allow the intensity of the light produced by each individual LED 12 to be adjusted.

Each of LEDs 12 is coupled, in the manner which will be described below in the discussion of FIG. 2, to an optical fiber 16. The coupling is accomplished in a manner which results in an efficient collection, by the optical fiber, of the light emitted by the diode without the imposition of any light focusing or intensification device, such as a lens, between the first end of the optical fiber and its associated light emitter. The optical fibers 16 are inserted in a coupler 18. In coupler 18, which includes a cylindrical sleeve, polished, flat second ends of individual fibers 16 are bonded to the polished first end of a further, large diameter, optical fiber 20 through the use of an optically clear, index matching, epoxy adhesive. The diameter of optical fiber 20 will, of course, be much larger than the diameter of the fibers 16 and the axes of the fibers 16 will, within cylindrical sleeve 18, be substantially parallel to the axis of the fiber 20. Optical fibers 16 and 20 can be comprised of plastic, will be flexible and will have a high numerical aperture.

Optical fiber 20 extends from coupler 18, and thus transmits light received from optical fibers 16, to a fiber termination 22 which may, for example, be an ST style optical connector. In the typical use environment, connector 22 will be coupled to an instrument which is used to analyze the light absorbtion of fluid samples. Through employment of the present invention, the sensitivity of such an instrument can be maximized by permitting the user to select the wavelength(s) of light being directed into the fluid sample so that the wavelength(s) which are most absorbable are utilized.

Figure 2:
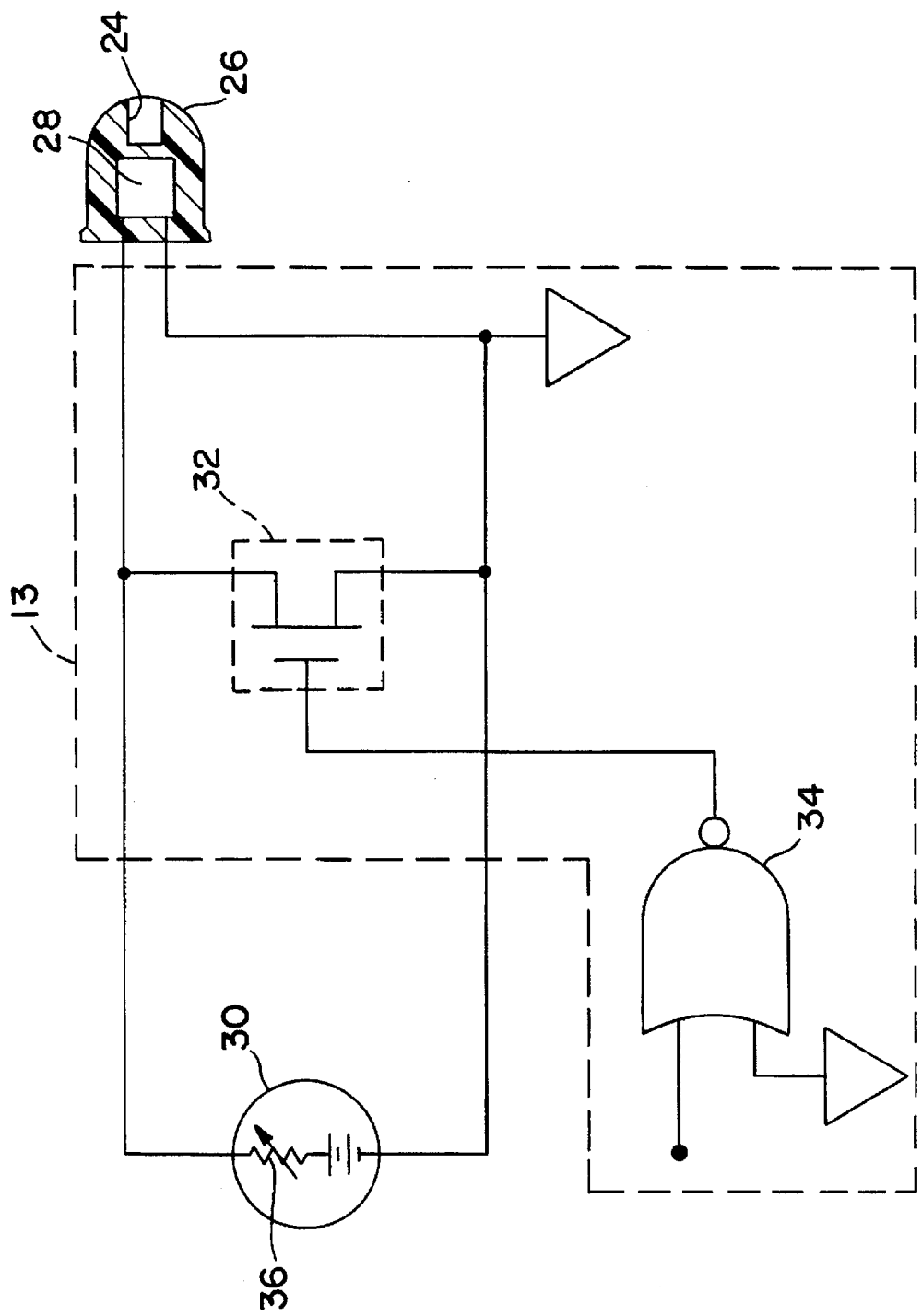
FIG. 2 is a schematic drawing which depicts one of the individual light generators of the apparatus of FIG. 1 and the means for selectively exercising control thereover.

With reference to FIG. 2, the control circuits 13 provide independent optical intensity and timing supervision for each LED 12. This enables the temporal and spectral characteristics of the optical output at the distal end of the optical fiber 20 to be easily manipulated. A key to achieving the desired performance and control, as mentioned above, is to efficiently collect the light generated by each LED 12. In accordance with the disclosed embodiment of the invention, an axial blind hole 24 is drilled in the clear plastic lens 26 of each LED. The bottom of the holes 24 are located as close as possible to the actual chip 28 of each diode without damaging the device. Polished, flat first ends of the individual optical fibers 16 are inserted in the holes 24 and are bonded in place by means of an optically clear, epoxy adhesive having a refractive index which is equal or close to that of the lens 26. The cross-sectional area of the optical fibers 16 is preferably larger than the front face, i.e., the light emitting region, of the associated chip 28.

An LED will produce light in response to the flow of direct current therethrough. Accordingly, a control circuit in accordance with the present invention includes a DC source 30 and means for selectively shunting current from source 30 away from or causing such current to flow through the LED. In the disclosed embodiment, the shunting means comprises a solid state switch 32 which is disclosed as a field effect transistor. The state of switch 32 is controlled by the output of a logic circuit 34 which, in the disclosed embodiment, is a NOR gate. In the disclosed embodiment, switch 32 is normally in the closed state, i.e., current is flowing through the FET and thus is shunted away from the LED 12. Under these conditions, the logic circuit 34 will be providing a positive bias to switch 32 so as to retain the switch in the conductive state. When it is desired to energize LED 12, a command signal will be delivered by selection circuit 14 to gate 34 which will cause switch 32 to be switched to the non-conductive state. With the switch 32 "opened", current from source 30 will flow through LED 12 and the LED will produce light at its characteristic wavelength. The intensity of the light provided by LED 12 will be a function of the magnitude of current flow therethrough. The LED current may be regulated, for example, by employing an adjustable current source 30. The light intensity control, accordingly, will also be achieved by selection circuit 14 and is schematically illustrated in FIG. 2 at 36.

To summarize the above, each of the LEDs 12 may be rapidly turned on and off simply by the application of a command signal to the input of an associated gate circuit 34. This control technique allows the LEDs to be "lit" and "extinguished" in a few nanoseconds. The magnitude of the current flow through an energized LED can be varied at will to control the intensity of the generated light. Thus, the color and intensity of the light source comprising the present invention, as provided at optical connector 22, may be easily manipulated to permit the user to select both the wavelength and the intensity of the output light. The light source may be operated in a pulsed mode to enhance temporal control of the generated light. The user, by mixing light of different color and varying the intensity of the generated light and/or duty cycle of the LEDs 12, can synthesize colors, i.e., the available light wavelengths can be mixed in such a manner that the present invention has utility in the art of color matching.

As will now be obvious to those of ordinary skill in the art, the present invention is a filterless chromatically variable light source which is characterized by reliability, compactness and low cost. This light source has the ability of enabling the rapid selection and display of high intensity "monochromatic" light of different color without the use of opto-mechanical elements such as filters and lenses.

While a preferred embodiment has been shown and described, various modifications and substitutions may thereto without departing from the spirit and scope of the invention. Accordingly, the present invention has been described by way of illustration and not limitation.

What is claimed is:

1. Filterless solid state apparatus for providing light at plural wavelengths comprising:

a plurality of light emitters, said light emitters each generating light lying within a narrow frequency band centered about a predetermined wavelength in response to energization by an electrical control signal, the predetermined wavelengths being different for each of said light emitters;

means for selectively generating control signals for energizing said light emitters whereby said light emitters may be selectively caused to generate light; and means for transmitting light generated by said light emitters to a common output port, said light transmitting means including:

a plurality of light transmissive optical fiber means, said optical fiber means each comprising a first optical fiber having oppositely disposed first and second ends;

means for coupling light generated by said light emitters into said first ends of respective of said first optical fibers; and means disposed at the second ends of said first optical fibers for combining light coupled into said first optical fibers from said light emitters, said combining means extending from said second ends of said first optical fibers to said output port.

2. The apparatus of claim 1 wherein said light emitters each comprise:

a light emitting diode, said light emitting diode including an active semiconductor device and means for encapsulating said semiconductor device, said encapsulating means including a lens portion; and wherein said coupling means comprises:

means for positioning said first ends of said first optical fibers in proximity to said semiconductor devices of said light emitting diodes, said positioning means extending at least partly through said lens portions of said encapsulating means.

3. The apparatus of claim 2 wherein said first optical fibers each have an axis and substantially the same diameter and wherein said combining means comprises:

a further optical fiber, said further optical fiber having an axis and a diameter which is greater than the diameter of said first fibers, said second ends of said first optical fibers being collected into a bundle, a first end of said further optical fiber being juxtapositioned to said second ends of said first optical fibers in said bundle, the axes of said first fiber second ends being oriented substantially parallel to one another and being parallel to the axis of said further optical fiber at said first end thereof.

4. The apparatus of claim 3 wherein at least said further optical fiber is flexible.

5. The apparatus of claim 1 wherein said control signal generating means comprises:

switch means for controlling the supply of energizing current to each of said light emitting diodes to switch said diodes between light emitting and extinguished states; and means for selectively generating command signals for said switch means whereby any one or more of said diodes may be caused to generate light.

6. The apparatus of claim 5 wherein said light emitting diodes each comprise:
an active semiconductor device and means for encapsulating said semiconductor device; and
wherein said coupling means comprises:
means for positioning said first ends of said first optical fibers in proximity to said semiconductor devices of respective of said light emitting diodes.

7. The apparatus of claim 6 wherein said encapsulating means each include a lens portion through which light generated by the associated diode may pass.

8. The apparatus of claim 7 wherein said positioning means includes:
a blind hole in each of said lens portions of said encapsulating means; and
an optically clear adhesive bonding said first fiber first ends in respective of said blind holes.

9. The apparatus of claim 2 wherein said positioning means includes:
a blind hole in each of said lens portions of said encapsulating means; and
an optically clear adhesive bonding said first fiber first ends to the bottoms of respective of said blind holes.

10. The apparatus of claim 5 wherein said control signal generating means further comprises:
a source of energizing current for each of said light emitting diodes; and
means for selectively adjusting the current flow through said diodes which are in the energized state in response to the generation of command signals whereby the intensity of the light generated by each diode may be controlled.

11. The apparatus of claim 10 wherein said light emitting diodes each comprise:
an active semiconductor device and means for encapsulating said semiconductor device; and
wherein said coupling means comprises:
means for positioning said first ends of said first optical fibers in proximity to said semiconductor devices of said light emitting diodes.

12. The apparatus of claim 11 wherein said encapsulating means each include a lens portion through which light generated by the associated diode may pass.

13. The apparatus of claim 12 wherein said positioning means includes:
a blind hole in the lens portion of the encapsulating means of each of said diodes; and
an optically clear adhesive bonding said first fiber ends in respective of said blind holes.

14. The apparatus of claim 13 wherein said further optical fiber is flexible.

15. The apparatus of claim 1 further comprising:
means for controlling the intensity of the light generated by each of said diodes.

16. Filterless solid state apparatus for providing light at plural wavelengths comprising:
a plurality of light emitters, said light emitters each generating light lying within a narrow frequency band centered about a predetermined wavelength in response to energization by an electrical control signal, the predetermined wavelengths being deferent for each of said light emitters;
means for selectively generating control signals for energizing said light emitters whereby said light emitters may be selectively caused to generate light at its predetermined wavelength; and
means for transmitting light generated by said light emitters to a common output port, said light transmitting means including:
a plurality of light transmissive optical fiber means, said optical fiber means each comprising a first optical fiber having first and second ends and an axis, said first optical fibers each having substantially the same diameter, said second ends of said first optical fibers being collected into a bundle wherein the axes of said first optical fibers at said second ends thereof are substantially parallel;
means for coupling light generated by said light emitters into said first ends of respective of said first optical fibers; and
means for combining light coupled into said first optical fibers from said light emitters, said combining means including a further optical fiber, said further optical fiber having an axis and also having a diameter which is greater than the diameter of said first optical fibers, a first end of said further optical fiber being juxtapositioned to said second ends of said first optical fibers in said bundle, the axis of said further optical fiber being substantially parallel to the axes of said first fiber second ends, said further optical fiber extending from said second ends of said first optical fibers to said output port.

17. The apparatus of claim 16 wherein said means for generating control signals comprises:
means for selectively delivering energizing current to each of said light emitters to switch said light emitters between light emitting and extinguished states; and
means for controlling the intensity of the light emitted by each of said light emitters.

18. Filterless solid state apparatus for providing light at plural wavelengths comprising:
a plurality of light emitters, said light emitters each generating light lying within a narrow frequency band centered about a predetermined wavelength in response to energization by an electrical control signal, the predetermined wavelength being different for each of said light emitters;
means for selectively generating control signals for energizing said light emitters whereby said emitters may be selectively caused to generate light at its predetermined wavelength; and
means for transmitting light generated by said light emitters to a common output port, said light transmitting means including:
a plurality of light transmissive optical fiber means, said optical fiber means each comprising a first optical fiber having first and second oppositely disposed ends, said first optical fibers each having an axis;
means for coupling light generated by said light emitters into a said first ends of a respective of a said first optical fibers;
sleeve means for receiving said second ends of said first optical fibers, said sleeve means arranging said first optical fiber second ends in close proximity to one another with their axes substantially parallel, said arranged second ends of said first optical fibers defining a bundle of optical fibers;

a further optical fiber having a diameter which is at least equal to the maximum transverse width of said bundle defined by said first optical fiber second ends, said further optical fiber having first and second oppositely disposed ends, said first end of said further optical fiber being disposed in said sleeve means in juxtapositioned relationship to said first optical fiber second ends, said further optical fiber extending from said first end thereof to said output port; and an optically clear adhesive bonding said first optical fiber second ends to said first end of said further optical fiber.

19. The apparatus of claim 18 wherein said light emitters each comprise:

a light emitting diode, said light emitting diode including an active semiconductor device and means for encapsulating said semiconductor device; and wherein said coupling means comprises:

means for positioning said first ends of said first optical fibers in registration with respective of said light emitting diode semiconductor devices.

20. The apparatus of claim 19 wherein said encapsulating means each includes a lens portion through which light emitted by the associated light emitting diode will pass.

21. The apparatus of claim 20 wherein said positioning means includes:

a blind hole in each said lens portion of said encapsulating means; and an optically clear adhesive securing said first fiber first ends in respective of said blind holes.

22. The apparatus of claim 21 wherein said control signal generating means comprises:

switch means for controlling the supply of energizing current to each of said light emitting diodes to switch said light emitting diodes between light emitting and extinguished states; and means for selectively generating command signals for said switch means whereby any one or more of said light emitting diodes may be caused to emit light.

23. The apparatus of claim 22 further comprising:

means for controlling the intensity of the light emitted by each of said light emitting diodes.

24. The apparatus of claim 23 wherein said first and further optical fibers are flexible.

* * * * *